O. D. LENT.
HARROW.
APPLICATION FILED FEB. 7, 1919.
1,327,337. Patented Jan. 6, 1920.
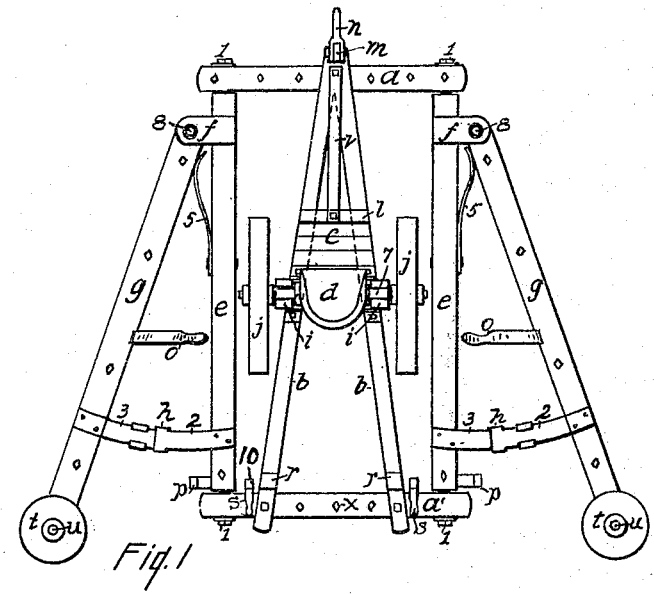
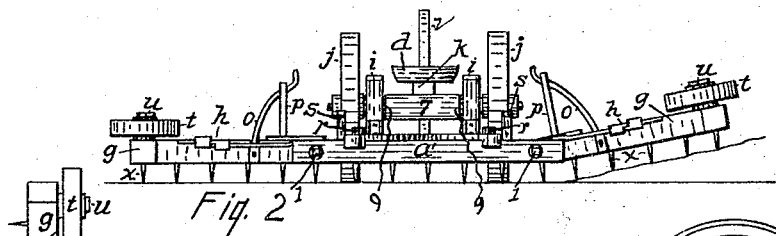
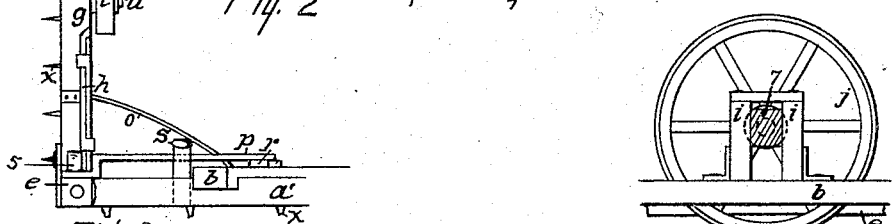
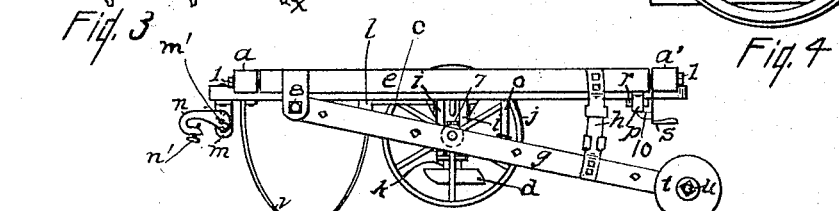
INVENTOR
Orlando D. Lent
BY
H. Anderson
ATTORNEY

UNITED STATES PATENT OFFICE.

ORLANDO D. LENT, OF PEEKSKILL, NEW YORK.

HARROW.

1,327,337.  Specification of Letters Patent.  Patented Jan. 6, 1920.

Application filed February 7, 1919. Serial No. 275,529.

*To all whom it may concern:*

Be it known that I, ORLANDO D. LENT, a citizen of the United States, residing at Peekskill, in the county of Westchester and State of New York, have invented new and useful Improvements in Harrows, of which the following is a specification.

The invention relates to harrows, and has for its object an implement adapted for uneven ground and for operation among obstacles, and that can be transported from place to place without loading on a wagon. The objects are attained by the means set forth in this specification and the accompanying drawings, in both of which like letters and numbers refer to similar parts in the several views.

Referring to the drawings, Figure 1 is a plan of the harrow. Fig. 2 is a rear elevation of the harrow. Fig. 3 is an enlarged detail of a foldable part of the harrow. Fig. 4 is an enlarged detail of the wheel features of the harrow. Fig. 5 is a side elevation of the harrow folded for transportation.

Fig. 1 illustrates the various parts of the harrow, which comprises a frame made up of the cross-pieces $a$ $a'$ and braces $b$ $b$, the braces set angularly in V form to give stiffness to the frame, and to afford space for a floor $c$ and foot brace $l$; also for guides $i$ $i$ for a wheel axle 7, the axle supporting a seat $d$. Between the ends of the cross-pieces $a$ $a'$ are vibrating beams $e$ $e$ that are held in place by pivotal bolts 1 1 1 1. At the forward ends of the beams are secured pivotal brackets $f$ $f$, and swinging beams $g$ $g$ are pivoted in the brackets as at 8. These swinging beams are held within limits by means of the clamping bars $h$ $h$ that clamp one upon the other as at 2 3 and freely slide one upon the other, permitting the beams to swing toward and from the beams $e$ $e$ to which they are hinged. Stout springs 5 5, secured to the beams $e$ $e$ and thrusting against the swinging beams keep them normally extended as in the figure. Harrow teeth are represented as at $x$.

The posts $i$ $i$ that are erected upon the braces $b$ $b$, shown in all the figures except Fig. 3 and in enlarged detail in Fig. 4, are guides for an axle 7 that carries the wheels $j$. The axle is reduced in size at its ends to set easily in the guides, and have shoulders 9 adjacent to the guides to prevent undue longitudinal motion of the axle. A support $k$ on the axle gives a support for a driver's seat $d$. When the harrow is in use, the play of the axle within its guides is such that the wheels will always rest on the ground, but the weight of the wheels and the driver will not rest upon the harrow.

Upon the swinging beams $g$ $g$ handles $o$ are attached within reach from the seat of the driver. The handles are for the manipulation of the swinging side sections of the harrow, as when they are to be helped over an obstruction. Upon the outer ends of the swinging beams $g$ $g$ are buffer wheels $t$ journaled at $u$, seen in all the figures except Fig. 4. These wheels have a double purpose. In harrowing, the swinging beams may make contact with a tree, to which the beam would do no harm except as the end of the beam swept past it, when it would be likely to injure the bark of the tree. The wheel eases the passage of the beam past the tree and saves the tree from injury. The other purpose of the wheels will be referred to later.

As thus far described the implement is usable in the field for its purposes of a harrow. As shown in Fig. 5 it is in shape for transporting. The swinging beams are brought to vertical positions as in Fig. 3. To retain them in such positions the beams $e$ $e$ are provided with bars $p$, shown in all the figures except Fig. 4, and on enlarged scale in Fig. 3. When folded the bars overlap the braces $b$ $b$ as in Fig. 3, resting upon the block elevations $r$. Stout springs $s$ with handles attached, are secured to the bar $a'$ and latch projections 10, Figs. 1 and 5, overlap the bars. When the side sections are thus secured the harrow is turned upside down as in Fig. 5. The rear of the harrow will ride upon the wheels $t$. The forward end will ride upon a loop $v$, Figs. 1, 2 and 5, secured to the foot brace and the forward end of the harrow. A natural suggestion would be: a wheel in the loop where it makes contact with the ground; but this harrow is designed for hilly lands, and the loop is designed to constitute a brake on hill sides and it rides easily upon other surfaces. By means of a special clevis shown plainly in Fig. 5, the clevis can be hooked on the tailboard of a wagon, thus lifting the forward end of the harrow from the ground. Even for hauling distances, any necessity for placing the harrow upon a wagon is obviated. The clevis is adjustable up or down on the post $m$, by means of a pin $m'$ and several holes provided in the post. The clevis hook $n$ is provided with a pin $n'$ for use to prevent a whiffletree ring from dropping out. The pin is to be backed out when the clevis is to be used as a hook for engagement with a wagon tail-board.

The swinging beams make it possible to use this harrow where the ordinary harrow cannot be used. If there are, say, two or more trees near together the ground between them cannot ordinarily be reached. But with this harrow a tree may be encountered and it will force the beam $g$ toward the beam $e$, but as soon as the tree is passed the spring 5 will force the beam out between the trees, so that all the ground can be treated. In stony ground the driver avoids obstructions by elevating either side, and the harrow adapts itself to uneven ground, as in Fig. 2, where the right hand side is seen to adapt itself to a slope of land.

Having described my invention what I claim and desire to secure by Letters Patent, is—

1. The combination in a harrow of a frame comprising front and rear bars united by V formed braces, vibrative beams pivoted between the ends of said cross bars, swinging beams hinged to said vibrative beams, the rear ends of said beams united by sliding clamping bars, a spring between the vibrative and swinging beams, buffer wheels on the outer ends of the swinging beams, handles on the swinging beams, wheel axle guides on the V braces, an axle loosely supported within said guides, wheels on the axle and a driver's seat on the axle.

2. The combination in a harrow of a frame comprising front and rear bars, V formed braces uniting said bars, vibrative beams pivoted between the ends of the cross bars, swinging beams hinged to said vibrative beams, sliding clamping bars uniting the swinging beams with the vibrative beams, springs to act against the swinging beams, handles on the swinging beams, wheel axle guides on the V braces, an axle loosely supported within said guides, wheels and a driver's seat on the axle, means for clamping the swinging beams at right angles to the main frame, a loop fast to the upper side of the front of the harrow, and a hook on the forward end of the harrow adapted for a clevis and for hooking to the tailboard of a wagon.

Signed at Peekskill, county of Westchester and State of New York, this 25th day of January, 1919.

ORLANDO D. LENT.

Witnesses:
CHARLES F. LENT,
FOWLER CHASE.